(12) United States Patent
Yu et al.

(10) Patent No.: US 11,931,722 B2
(45) Date of Patent: Mar. 19, 2024

(54) PREPARATION METHOD FOR CARBON DIOXIDE CAPTURE AGENT, AND APPLICATION THEREOF

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Haijun Yu, Foshan (CN); Aixia Li, Foshan (CN); Yinghao Xie, Foshan (CN); Xuemei Zhang, Foshan (CN); Yingsheng Zhong, Foshan (CN); Changdong Li, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 0 days.

(21) Appl. No.: 18/259,993

(22) PCT Filed: Aug. 22, 2022

(86) PCT No.: PCT/CN2022/112238
§ 371 (c)(1),
(2) Date: Jun. 29, 2023

(87) PCT Pub. No.: WO2023/071410
PCT Pub. Date: May 4, 2023

(65) Prior Publication Data
US 2024/0050926 A1  Feb. 15, 2024

(30) Foreign Application Priority Data

Oct. 29, 2021 (CN) .......................... 202111270651.9

(51) Int. Cl.
*B01D 53/22* (2006.01)
*B01D 53/02* (2006.01)
(Continued)

(52) U.S. Cl.
CPC .......... *B01J 20/3202* (2013.01); *B01D 53/02* (2013.01); *B01J 20/22* (2013.01); *B01J 20/3217* (2013.01);
(Continued)

(58) Field of Classification Search
CPC .... B01J 20/3217; B01J 20/22; B01J 20/3202; B01J 20/3244; B01D 53/02; B01D 2253/20; B01D 2257/504
See application file for complete search history.

(56) References Cited

U.S. PATENT DOCUMENTS 7,507,274 B2 * 3/2009 Tonkovich ........... B01J 19/0093
  95/143
8,715,392 B2 * 5/2014 Liu ..................... H01M 8/0289
  96/5

(Continued)

FOREIGN PATENT DOCUMENTS

CN    101890340 A    11/2010
CN    104056599 A    9/2014
(Continued)

OTHER PUBLICATIONS

CN104907045A_Machine Translation, FENG, 11 pp. Sep. 16, 2015 (Year: 2015).*
(Continued)

*Primary Examiner* — Anthony R Shumate
(74) *Attorney, Agent, or Firm* — Buchalter; Jason W. Croft

(57) ABSTRACT

Disclosed are a preparation method of a carbon dioxide capture agent and an application thereof. The method
(Continued)

includes: mixing a graphite dispersion, an organic acid solution, a metal salt solution and a silica sol to obtain an organic-inorganic composite gel; standing and aging the organic-inorganic composite gel, drying the same and then carbonizing the same by microwave in a mixed atmosphere of inert gas and sulfur dioxide to obtain an intermediate product; and subjecting the intermediate product to acid washing or alkali washing to obtain a defective carrier, then mixing the defective carrier with an amine substance for ultrasonic treatment and drying to obtain the carbon dioxide capture agent.

9 Claims, 2 Drawing Sheets

(51) Int. Cl.
*B01J 20/22* (2006.01)
*B01J 20/32* (2006.01)

(52) U.S. Cl.
CPC ....... *B01J 20/3244* (2013.01); *B01D 2253/20* (2013.01); *B01D 2257/504* (2013.01)

(56) References Cited

U.S. PATENT DOCUMENTS

| | | | |
|---|---|---|---|
| 2006/0148642 A1 | 7/2006 | Ryu et al. | |
| 2011/0265654 A1* | 11/2011 | Eisenhardt | B01J 20/22 96/108 |
| 2012/0055334 A1* | 3/2012 | Ogata | B01D 53/323 95/131 |
| 2016/0045841 A1* | 2/2016 | Kaplan | C01B 32/05 429/49 |
| 2017/0304812 A1* | 10/2017 | Casci | B01D 53/9436 |
| 2019/0015815 A1* | 1/2019 | Lawrence | B01J 20/28069 |
| 2019/0046916 A1* | 2/2019 | Safir | B01J 20/3085 |
| 2019/0309455 A1* | 10/2019 | Cross | F01N 3/101 |
| 2020/0291901 A1* | 9/2020 | Song | F02M 21/0215 |
| 2021/0260561 A1* | 8/2021 | Onaizi | B01J 20/28083 |
| 2023/0149891 A1* | 5/2023 | Yuan | B01J 20/04 502/79 |
| 2023/0382805 A1* | 11/2023 | Yu | C04B 35/64 |

FOREIGN PATENT DOCUMENTS

| | | |
|---|---|---|
| CN | 104117343 A | 10/2014 |
| CN | 104907045 A | 9/2015 |
| CN | 107188188 A | 9/2017 |
| CN | 114192115 A | 3/2022 |
| CN | 114192115 B | 4/2023 |
| JP | 2004136164 A | 5/2004 |
| JP | 2021117529 A | 8/2021 |

OTHER PUBLICATIONS

Written Opinion in PCT/CN2022/112238 dated Oct. 28, 2022.
International Search Report in PCT/CN2022/112238 dated Oct. 28, 2022.
First Search in Chinese Patent Application 2021112706519 dated Nov. 25, 2022.
Notification to Grant Patent Right for Invention in Chinese Application No. 2021112706519 dated Jan. 11, 2023.

* cited by examiner

PREPARATION METHOD FOR CARBON DIOXIDE CAPTURE AGENT, AND APPLICATION THEREOF

CROSS-REFERENCE TO RELATED APPLICATION

This application is a national stage filing under 35 U.S.C. § 371 of international application number PCT/CN2022/112238, filed Aug. 12, 2022, which claims priority to Chinese patent application No. 202111270651.9 filed Oct. 29, 2021. The contents of these applications are incorporated herein by reference in their entirety.

TECHNICAL FIELD

The present disclosure belongs to the technical field of carbon collection, and particularly relates to a preparation method of a carbon dioxide capture agent and an application thereof.

BACKGROUND

As a rich and cheap carbon source, $CO_2$ has been used to produce various carbon source chemicals, such as inorganic, organic and polymer chemicals, and has great economic and environmental benefits. Therefore, after fuel combustion, $CO_2$ capture is an important research orientation, which is mainly used to treat low-concentration $CO_2$ emissions.

Generally, in battery recycling, crushed battery pieces are pyrolyzed with oxygen at 300° C. to 800° C. to promote the volatilization or decomposition of a binder and an electrolyte, so as to separate positive materials from current collectors. However, at present, greenhouse gases produced by pyrolysis, especially $CO_2$, are directly emitted after dust removal and de-acidification, which does not meet the requirements of green production. To solve this problem, $CO_2$ is recovered by measures of adding carbon capture materials and carbon recycling devices.

At present, the chemical absorption of $CO_2$ by amine-based materials is one of the commonly used $CO_2$ recycling and capturing technologies, which has the characteristics of high selectivity and large capture amount. However, this method has the following problems. 1. The material cost of this method is relatively high. 2. In order to increase the capture amount of $CO_2$, excess amine-based materials are usually added into a carrier. When the introduced amines occupy too much pore volume in the supporting carrier, the exposure of amine sites will be reduced, but the $CO_2$ capture efficiency will be reduced.

SUMMARY

The present disclosure aims at solving at least one of the above-mentioned technical problems in the existing technology. Therefore, the present disclosure provides a preparation method of a carbon dioxide capture agent and an application thereof, which can improve the synthesis of amine-based materials and be applied to carbon recycling in batteries recycled by pyrolysis.

According to one aspect of the present disclosure, a preparation method of a carbon dioxide capture agent is provided, including the following steps of:

S1: mixing a graphite dispersion, an organic acid solution, a metal salt solution and a silica sol to obtain an organic-inorganic composite gel;

S2: standing and aging the organic-inorganic composite gel, drying the same and then carbonizing the same by microwave in a mixed atmosphere of inert gas and sulfur dioxide to obtain an intermediate product; and S3: subjecting the intermediate product to acid washing or alkali washing to obtain a defective carrier, then mixing the defective carrier with an amine substance for ultrasonic treatment and drying to obtain the carbon dioxide capture agent.

In some embodiments of the present disclosure, in step S1, the graphite dispersion is an alcohol dispersion of graphite powder; in the graphite dispersion, a solid-liquid ratio of the graphite powder to the alcohol is (0.1 to 20) g: 100 mL; a mass concentration of the organic acid solution ranges from 1% to 30%; and a volume ratio of the graphite dispersion to the organic acid solution is (1 to 5): 10. Preferably, the organic acid solution is at least one solution of malic acid, acetic acid, citric acid or ascorbic acid.

In some embodiments of the present disclosure, where in step S1, the graphite dispersion is firstly added into the organic acid solution to obtain a solution A, and then the metal salt solution and the silica sol are added in the solution A to obtain the organic-inorganic composite gel; a mass concentration of the metal salt solution ranges from 0.1% to 10%; and a volume ratio of the metal salt solution to the solution A is (1 to 10):(3 to 15).

In some embodiments of the present disclosure, in step S1, the graphite powder comes from a graphite powder obtained by washing, drying and ball-milling negative graphite slags in battery recycling, and a particle size of the graphite powder is less than 50 μm. Using the negative graphite obtained from battery recycling to replace a carrier pore adjustment material can reduce a synthesis cost of the capture agent.

In some embodiments of the present disclosure, in step S1, the alcohol solution is one or more of methanol, ethanol, ethylene glycol, diethanol or propanol.

In some embodiments of the present disclosure, in step S1, the metal salt solution is at least one solution of sodium sulfate, aluminum sulfate, manganese sulfate, cobalt sulfate, nickel sulfate, copper sulfate, sodium chloride, aluminum chloride or copper chloride. Preferably, the metal salt solution is prepared by reacting metals (such as copper powder and aluminum powder) obtained by battery recycling with acids (such as sulfuric acid and hydrochloric acid), or prepared by waste brine generated by battery recycling. The metal skeleton material of the carrier is prepared from battery recyclables, which can reduce the synthesis cost of the capture agent.

In some embodiments of the present disclosure, in step S1, a solid content of the silica sol ranges from 3 wt % to 45 wt %; and an addition amount of the silica sol is 0.1% to 5% of a total volume of the solution A and the metal salt solution.

In some embodiments of the present disclosure, in step S2, the carbonizing with microwave is performed at a temperature of 100° C. to 300° C., and lasts for 3 minutes to 30 minutes.

In some embodiments of the present disclosure, in step S2, a volume ratio of the inert gas to the sulfur dioxide in the mixed atmosphere is (60 to 100):(5 to 40).

In some embodiments of the present disclosure, in step S2, the aging lasts for 6 hours to 24 hours.

In some embodiments of the present disclosure, in step S2, the drying is performed at a temperature of 70° C. to 120° C.

In some embodiments of the present disclosure, in step S3, at least one of nitric acid, hydrochloric acid, sulfuric acid or phosphoric acid with a concentration of 0.01 mol/L to 1 mol/L is used for the acid washing.

In some embodiments of the present disclosure, in step S3, the amine substance is at least one of acrylamide, diethylenetriamine, ethanolamine, propanolamine or isopropanolamine. Preferably, a solid-liquid ratio of the defective carrier to the amine substance is 100 g:(10 to 90) mL.

In some embodiments of the present disclosure, in step S3, the drying includes: loading the material after ultrasonic treatment into a mold for drying.

In some embodiments of the present disclosure, in step S3, the drying lasts for 2 hours to 12 hours.

The present disclosure further provides an application of the carbon dioxide capture agent prepared by the preparation method in treating exhaust gases produced by waste battery pyrolysis. Specifically, the carbon dioxide capture agent is cut into a long column shape, loaded into a capture tube, and exhaust gases after dust removal and de-acidification is subjected to carbon dioxide capturing for a certain time, and then desorbed and recycled. Preferably, the capturing lasts for 15 minutes to 120 minutes. The carbon dioxide capture agent after capturing is desorbed at 60° C. to 70° C., and the desorbed gases are absorbed with excessive sodium carbonate solution.

According to a preferred embodiment of the present disclosure, the present disclosure has at least the following beneficial effects.

1. Collaborative treatment among different materials improves the performances of the material: (1) a carbon-based skeleton material with an organic acid as a carrier and a metal skeleton material with a metal salt as a carrier are carbonized at low temperature to obtain a carbon-metal composite carrier, and the carrier prepared by compounding the carbon with the metal salt has stable structure, developed activity and larger specific surface area. Therefore, the carrier has better functionality. (2) Because the characteristics of the carrier thereof determine the stability of the circulation and efficiency thereof, the larger pores of the graphite material are used to adjust the ratio of large and small pores and increase the ratio of large and medium pores, while the large and medium pores are beneficial to increase the load of amines, reduce the load pressure of the small pores and prevent amines from blocking. The mechanical strength of the carrier can be improved and the pore fracture and collapse can be reduced by using the characteristics of the silica sol such as difficult aging, high specific surface area and strong viscosity. (3) During the low temperature carbonizing, the nitrogen and the sulfur dioxide are used to cooperatively treat the carrier, and then the carrier is subjected to defect treatment by acid washing. After the defect treatment, a position where the sulfur dioxide is attached in the original carrier pore is vacant, and a large number of structural defects are generated in the pores of the carrier. Heteroatom defects can expand the interlayer interval of the carbon materials, reduce the transfer restriction of amines in the material carrier, and improve the utilization rate of amines, thus improving the carbon dioxide capture amount.

2. The improved carbonizing method can reduce the synthesis cost: different from a conventional high-temperature long-time (greater than 500° C. and greater than 2 hours) anoxic carbonizing method, the carbonizing method in the present disclosure is changed to low-temperature ultra-short-time microwave reaction for carbonizing, which requires lower temperature, shorter time and lower energy consumption.

BRIEF DESCRIPTION OF DRAWINGS

The present disclosure will be further explained with reference to the accompanying drawings and embodiments hereinafter, where.

DETAILED DESCRIPTION

The concepts and the technical effects produced of the present disclosure will be clearly and completely described in conjunction with the embodiments and the accompanying drawings so as to sufficiently understand the objects, the features and the effects of the present disclosure. Obviously, the described embodiments are merely some embodiments of the disclosure, rather than all the embodiments. Other embodiments obtained by those skilled in the art without going through any creative effort shall all fall within the protection scope of the disclosure.

Embodiment 1

Figure 1:
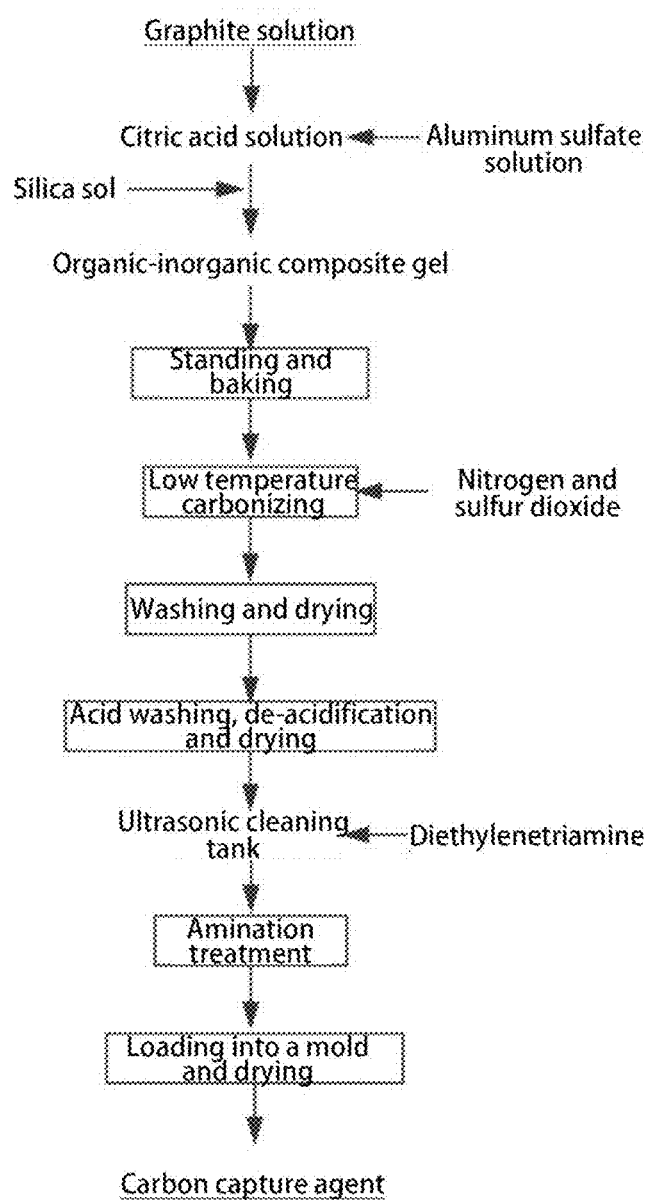
FIG. 1 is a process flowchart of Embodiment 1 of the present disclosure.
Figure 3:
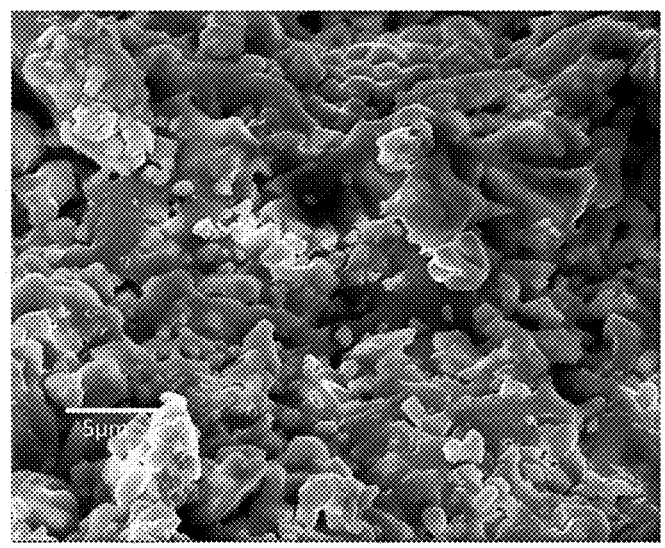
FIG. 3 is an SEM graph of a carbon dioxide capture agent prepared in Embodiment 1 of the present disclosure.

In this embodiment, a carbon dioxide capture agent was prepared. Referring to FIG. 1, the specific process was as follows:

(1) preparing an organic-inorganic composite gel: under sufficient stirring, dropwise adding 15 mL of graphite dispersion to 100 mL of 8.7 wt % citric acid solution to obtain a solution A, taking 40 mL of solution A, and dropwise adding 16 mL of 5.7 wt % aluminum sulfate solution into the 40 mL of solution A, and then dropwise adding 4 mL of silica sol (23 wt %) to obtain about 60.0 mL of organic-inorganic composite gel;

graphite dispersion: dispersing 1.5 g of graphite powder obtained by washing, drying and ball-milling negative graphite slags in battery recycling to a particle size less than 50 μm into 15 mL of propanol solution to obtain the graphite dispersion;

(2) obtaining an organic-inorganic carrier by low temperature carbonizing: standing and aging the organic-inorganic composite gel for 12 hours, baking the same in an oven at 95° C. for 70 minutes, sending the same to a microwave device filled with nitrogen and sulfur dioxide ($N_2$/$SO_2$ volume at normal pressure=90:5), carbonizing the same at 210° C. for 18 minutes, cooling the same to 25° C., and then washing and drying the same to a constant weight, thus obtaining 23.7 g of black intermediate product, i.e., the organic-inorganic carrier; and (3) subjecting the carrier to defect treatment and amination treatment: the defect treatment included: washing the organic-inorganic carrier with 0.17 mol/L nitric acid for three times to remove impurities, then washing the organic-inorganic carrier with deionized water for four times to de-acidify and dry to obtain a sulfur-defective organic-inorganic carrier, sending 20 g of the sulfur-defective organic-inorganic carrier into an ultrasonic cleaning tank, and then adding 15 g of liquid diethylenetriamine and stirring for amination treatment, loading the mixture into a cylinder mold, and sending the mold to an oven for drying at 30° C. for 4 hours to obtain the carbon dioxide capture agent, where an SEM graph of the carbon dioxide capture agent was shown in FIG. 3.

Figure 2:
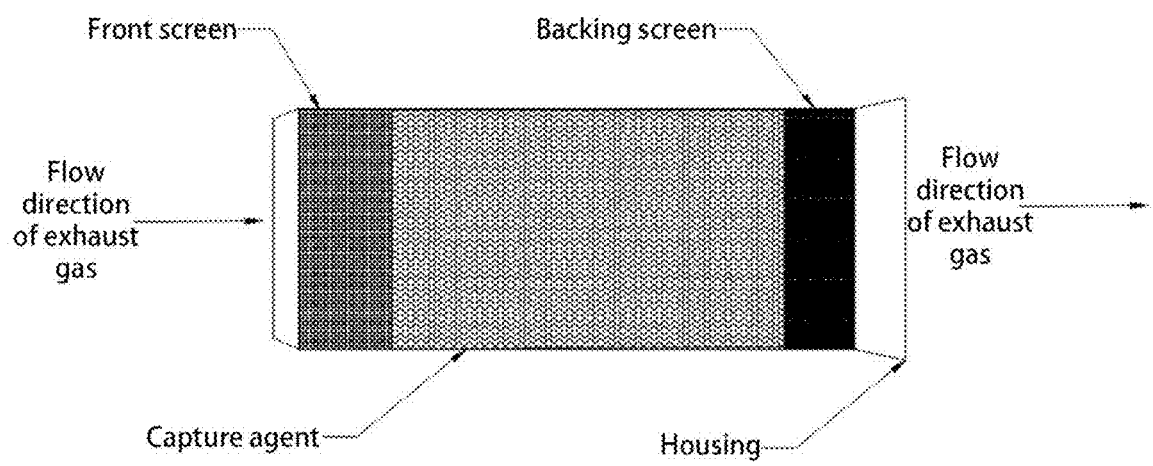
FIG. 2 is a schematic structure diagram of a capture tube of Embodiment 1 of the present disclosure.

Capturing carbon dioxide: loading the remaining 27.7 g of the carbon dioxide capture agent after cutting into a capture tube, where the structure of the capture tube was shown in FIG. 2, subjecting exhaust gases after dust removal and de-acidification to carbon dioxide capture for 60 minutes, then recycling and desorbing at 65° C., and absorbing the desorbed gases by excessive sodium hydroxide solution.

Embodiment 2

In this embodiment, a carbon dioxide capture agent was prepared, and the specific process was as follows:
(1) preparing an organic-inorganic composite gel: under sufficient stirring, dropwise adding 15 mL of graphite dispersion to 100 mL of 8.7 wt % citric acid solution to obtain a solution A, taking 40 mL of solution A, and dropwise adding 10 mL of 1.77 w % nickel sulfate solution into the 40 mL of solution A, and then dropwise adding 3 mL of silica sol (23 wt %) to obtain about 53.0 mL of organic-inorganic composite gel;
graphite dispersion: dispersing 3 g of graphite powder obtained by washing, drying and ball-milling negative graphite slags in battery recycling to a particle size less than 50 μm into 25 mL of propanol solution to obtain the graphite dispersion;
(2) obtaining an organic-inorganic carrier by low temperature carbonizing: standing and aging the organic-inorganic composite gel for 12 hours, baking the same in an oven at 95° C. for 75 minutes, sending the same to a microwave device filled with nitrogen and sulfur dioxide ($N_2/SO_2$ volume at normal pressure=90:10), carbonizing the same at 175° C. for 20 minutes, cooling the same to 25° C., and then washing and drying the same to a constant weight, thus obtaining 20.2 g of black intermediate product, i.e., the organic-inorganic carrier; and
(3) subjecting the carrier to defect treatment and amination treatment: the defect treatment included: washing the organic-inorganic carrier with 0.34 mol/L nitric acid for three times to remove impurities, then washing the organic-inorganic carrier with deionized water for four times to de-acidify and dry to obtain a sulfur-defective organic-inorganic carrier, sending 20 g of the sulfur-defective organic-inorganic carrier into an ultrasonic cleaning tank, and then adding 15 g of liquid diethylenetriamine and stirring for amination treatment, loading the mixture into a cylinder mold, and sending the mold to an oven for drying at 95° C. for 4 hours to obtain the carbon dioxide capture agent.

Capturing carbon dioxide: loading the remaining 26.8 g of the carbon dioxide capture agent after cutting into a capture tube, subjecting exhaust gases after dust removal and de-acidification to carbon dioxide capture for 60 minutes, then recycling and desorbing at 65° C., and absorbing the desorbed gases by excessive sodium hydroxide solution.

Embodiment 3

In this embodiment, a carbon dioxide capture agent was prepared, and the specific process was as follows:
(1) preparing an organic-inorganic composite gel: under sufficient stirring, dropwise adding 18 mL of graphite dispersion to 100 mL of 8.7 wt % citric acid solution to obtain a solution A, taking 40 mL of solution A, and dropwise adding 16 mL of 2.36 wt % copper sulfate solution into the 40 mL of solution A, and then dropwise adding 3 mL of silica sol (23 wt %) to obtain about 59.0 mL of organic-inorganic composite gel;
graphite dispersion: dispersing 2.0 g of graphite powder obtained by washing, drying and ball-milling negative graphite slags in battery recycling to a particle size less than 50 μm into 18 mL of propanol solution to obtain the graphite dispersion;
(2) obtaining an organic-inorganic carrier by low temperature carbonizing: standing and aging the organic-inorganic composite gel for 12 hours, baking the same in an oven at 95° C. for 70 minutes, sending the same to a microwave device filled with nitrogen and sulfur dioxide ($N_2/SO_2$ volume at normal pressure=90:5), carbonizing the same at 210° C. for 15 minutes, cooling the same to 25° C., and then washing and drying the same to a constant weight, thus obtaining 23.7 g of black intermediate product, i.e., the organic-inorganic carrier; and
(3) subjecting the carrier to defect treatment and amination treatment: the defect treatment included: washing the organic-inorganic carrier with 0.34 mol/L nitric acid for three times to remove impurities, then washing the organic-inorganic carrier with deionized water for four times to de-acidify and dry to obtain a sulfur-defective organic-inorganic carrier, sending 20 g of the sulfur-defective organic-inorganic carrier into an ultrasonic cleaning tank, and then adding 25 g of liquid ethanolamine and stirring for amination treatment, loading the mixture into a cylinder mold, and sending the mold to an oven for drying at 95° C. for 4 hours to obtain the carbon dioxide capture agent.

Capturing carbon dioxide: loading the remaining 29.3 g of the carbon dioxide capture agent after cutting into a capture tube, subjecting exhaust gases after dust removal and de-acidification to carbon dioxide capture for 60 minutes to recycling, desorbing at 65° C., and absorbing the desorbed gases by excessive sodium hydroxide solution.

Embodiment 4

In this embodiment, a carbon dioxide capture agent was prepared, and the specific process was as follows:
(1) preparing an organic-inorganic composite gel: under sufficient stirring, dropwise adding 20 mL of graphite dispersion to 100 mL of 8.7 wt % citric acid solution to obtain a solution A, taking 40 mL of solution A, and dropwise adding 18 mL of 4.47 wt % aluminum sulfate solution into the 40 mL of solution A, and then dropwise adding 2 mL of silica sol (23 wt %) to obtain about 57.9 mL of organic-inorganic composite gel;
graphite dispersion: dispersing 4.0 g of graphite powder obtained by washing, drying and ball-milling negative graphite slags in battery recycling to a particle size less than 50 μm into 35 mL of propanol solution to obtain 35 mL of graphite dispersion;
(2) obtaining an organic-inorganic carrier by low temperature carbonizing: standing and aging the organic-inorganic composite gel for 12 hours, baking the same in an oven at 95° C. for 70 minutes, sending the same to a microwave device filled with nitrogen and sulfur dioxide ($N_2/SO_2$ volume at normal pressure=90:5), carbonizing the same at 260° C. for 12 minutes, cooling the same to 25° C., and then washing and drying the same to a constant weight, thus obtaining 23.7 g of black intermediate product, i.e., the organic-inorganic carrier; and
(3) subjecting the carrier to defect treatment and amination treatment: the defect treatment included: washing the organic-inorganic carrier with 0.34 mol/L nitric acid for three times to remove impurities, then washing the organic-inorganic carrier with deionized water for four times to de-acidify and dry to obtain a sulfur-defective organic-inorganic carrier, sending 20 g of the sulfur-defective organic-inorganic carrier into an ultrasonic cleaning tank, and then adding 20 g of liquid ethanolamine and stirring for amination treatment, loading the mixture into a cylinder mold, and sending the mold to an oven for drying at 95° C. for 4 hours to obtain the carbon dioxide capture agent.

Capturing carbon dioxide: loading the remaining 27.7 g of the carbon dioxide capture agent after cutting into a capture tube, subjecting exhaust gases after dust removal and de-acidification to carbon dioxide capture for 60 minutes to recycling, desorbing at 65° C., and absorbing the desorbed gases by excessive sodium hydroxide solution.

Comparative Example 1

In this comparative example, a carbon dioxide capture agent was prepared, and the specific process was as follows:
(1) preparing an organic-inorganic composite gel: under sufficient stirring, dropwise adding 20 mL of graphite dispersion to 100 mL of 8.7 wt % citric acid solution to obtain a solution A, taking 40 mL of solution A, and dropwise adding 16 mL of 5.7 wt % aluminum sulfate solution into the 40 mL of solution A, and then dropwise adding 2 mL of silica sol (23 wt %) to obtain about 57.8 mL of organic-inorganic composite gel;
graphite dispersion: dispersing 2.0 g of graphite powder obtained by washing, drying and ball-milling negative graphite slags in battery recycling to a particle size less than 50 μm into 20 mL of propanol solution to obtain the graphite dispersion;
(2) obtaining an organic-inorganic carrier by low temperature carbonizing: standing and aging the organic-inorganic composite gel for 12 hours, baking the same in an oven at 95° C. for 70 minutes, sending the same to a microwave device and injecting air, carbonizing the same at 210° C. for 4 hours, cooling the same to 25° C., and then washing and drying the same to a constant weight, thus obtaining 23.7 g of black intermediate product; and
(3) subjecting the carrier to amination treatment: sending 20 g of the organic-inorganic carrier into an ultrasonic cleaning tank, and then adding 15 g of liquid diethylenetriamine and stirring for amination treatment, loading the mixture into a cylinder mold, and sending the mold to an oven for drying at 95° C. for 4 hours to obtain the carbon dioxide capture agent.

Capturing carbon dioxide: loading the remaining 26.5 g of the carbon capture agent after cutting into a capture tube, subjecting exhaust gases after dust removal and de-acidification to carbon dioxide capture for 60 minutes to recycling, desorbing at 65° C., and absorbing the desorbed gases by excessive sodium hydroxide solution.

Comparative Example 2

In this comparative example, a carbon dioxide capture agent was prepared, and the specific process was as follows:
(1) preparing an organic-inorganic composite gel: under sufficient stirring, dropwise adding 16 mL of 2.36 wt % copper sulfate solution into 40 mL of 8.7 wt % citric acid solution, and then dropwise adding 2 mL of silica sol (23 wt %) to obtain about 57.4 mL of organic-inorganic composite gel;
(2) obtaining an organic-inorganic carrier by low temperature carbonizing: standing and aging the organic-inorganic composite gel for 12 hours, baking the same in an oven at 95° C. for 70 minutes, sending the same to a microwave device and injecting air, carbonizing the same at 210° C. for 4 hours, cooling the same to 25° C., and then washing and drying the same to a constant weight, thus obtaining 23.7 g of black carrier; and
(3) subjecting the carrier to amination treatment: the defect treatment included: sending 20 g of the black carrier into an ultrasonic cleaning tank, and then adding 15 g of liquid diethylenetriamine and stirring for amination treatment, loading the mixture into a cylinder mold, and sending the mold to an oven for drying at 95° C. for 4 hours to obtain the carbon dioxide capture agent.

Capturing carbon dioxide: loading the remaining 25.2 g of the carbon capture agent after cutting into a capture tube, subjecting exhaust gases after dust removal and de-acidification to carbon dioxide capture for 60 minutes to recycling, desorbing at 65° C., and absorbing the desorbed gases by excessive sodium hydroxide solution.

TABLE 1

Analysis of carbon dioxide adsorbing capacities of Embodiments 1 to 4 and Comparative Examples 1 to 2

| Groups | First adsorbing capacity (mg/g) | Fifth adsorbing capacity (mg/g) | Eighth adsorbing capacity (mg/g) |
|---|---|---|---|
| Embodiment 1 | 132.06 | 123.43 | 105.74 |
| Embodiment 2 | 136.90 | 125.60 | 106.14 |
| Embodiment 3 | 113.37 | 109.36 | 98.356 |
| Embodiment 4 | 116.47 | 108.45 | 96.35 |
| Comparative Example 1 | 97.36 | 80.19 | 66.69 |
| Comparative Example 2 | 94.36 | 78.90 | 64.71 |

It can be seen from Table 1 that the carbon dioxide adsorbing capacities of Embodiments 1 to 4 are relatively high, while Comparative Examples 1 and 2 are not subjected to the defect treatment, and the carbon dioxide adsorbing capacities are not as good as those of the embodiments. This is because that the defect treatment can make a position where the sulfur dioxide is attached in the original carrier pores vacant, and a large number of structural defects are generated in the pores of the carrier. Heteroatom defects can expand the interlayer interval of the carbon materials, reduce the transfer restriction of amines in the material carrier, and improve the utilization rate of amines, thus improving the carbon dioxide capture amount. No graphite is added in Comparative Example 2, and the carbon dioxide adsorbing capacity thereof is further reduced. This is because that the graphite material has larger pores, and the ratio of large and small pores can be adjusted to increase the ratio of large and medium pores, while the medium and large pores are beneficial to increase the load of amines, reduce the load pressure of small pores and prevent amines from blocking. The load of amines is reduced since no graphite is added in Comparative Example 2.

The embodiments of the present disclosure are described in detail with reference to the drawings above, but the present disclosure is not limited to the above embodiments, and various changes may also be made within the knowledge scope of those of ordinary skills in the art without departing from the purpose of the present disclosure. In addition, in case of no conflict, the embodiments in the application and the features in the embodiments may be combined with each other.

The invention claimed is:

1. A preparation method of a carbon dioxide capture agent, comprising the following steps of:
   S1: mixing a graphite dispersion, an organic acid solution, a metal salt solution and a silica sol to obtain an organic-inorganic composite gel;
   S2: subjecting the organic-inorganic composite gel to standing, aging and drying and then carbonizing the same by microwave in a mixed atmosphere of inert gas and sulfur dioxide to obtain an intermediate product; and
   S3: subjecting the intermediate product to acid washing or alkali washing to obtain a defective carrier, then mixing the defective carrier with an amine substance for ultrasonic treatment and drying to obtain the carbon dioxide capture agent.

2. The preparation method according to claim 1, wherein in step S1, the graphite dispersion is an alcohol dispersion of graphite powder; in the graphite dispersion, a solid-liquid ratio of the graphite powder to the alcohol is (0.1 to 20) g: 100 mL; a mass concentration of the organic acid solution ranges from 1% to 30%; and a volume ratio of the graphite dispersion to the organic acid solution is (1 to 5): 10.

3. The preparation method according to claim 1, wherein in step S1, the graphite dispersion is firstly added into the organic acid solution to obtain a solution A, and then the metal salt solution and the silica sol are added in the solution A to obtain the organic-inorganic composite gel; a mass concentration of the metal salt solution ranges from 0.1% to 10%; and a volume ratio of the metal salt solution to the solution A is (1 to 10):(3 to 15).

4. The preparation method according to claim 1, wherein in step S1, the metal salt solution is at least one solution of sodium sulfate, aluminum sulfate, manganese sulfate, cobalt sulfate, nickel sulfate, copper sulfate, sodium chloride, aluminum chloride or copper chloride.

5. The preparation method according to claim 3, wherein in step S1, a solid content of the silica sol ranges from 3 wt % to 45 wt %; and an addition amount of the silica sol is 0.1% to 5% of a total volume of the solution A and the metal salt solution.

6. The preparation method according to claim 1, wherein in step S2, the carbonizing by microwave is performed at a temperature of 100° C. to 300° C., and lasts for 3 minutes to 30 minutes.

7. The preparation method according to claim 1, wherein in step S2, a volume ratio of the inert gas to the sulfur dioxide in the mixed atmosphere is (60 to 100):(5 to 40).

8. The preparation method according to claim 1, wherein in step S3, at least one of nitric acid, hydrochloric acid, sulfuric acid or phosphoric acid with a concentration of 0.01 mol/L to 1 mol/L is used for the acid washing.

9. The preparation method according to claim 1, wherein in step S3, the amine substance is at least one of acrylamide, diethylenetriamine, ethanolamine, propanolamine or isopropanolamine.

* * * * *